(12) United States Patent
Giagni, Jr. et al.

(10) Patent No.: US 7,225,828 B2
(45) Date of Patent: Jun. 5, 2007

(54) DECORATIVE FAUCET ASSEMBLY FORMED OF PLASTIC FIGURINE MOLDED ONTO METAL PARTS

(76) Inventors: Vincent Giagni, Jr., 23 Pheasant Dr., Rye, NY (US) 10580; Hal Weinstein, 430 Gonston Hall Dr., Alpharetta, GA (US) 30004

( * ) Notice: Subject to any disclaimer, the term of this patent is extended or adjusted under 35 U.S.C. 154(b) by 160 days.

(21) Appl. No.: 11/084,171

(22) Filed: Mar. 21, 2005

(65) Prior Publication Data

US 2006/0207665 A1    Sep. 21, 2006

(51) Int. Cl.
*F16K 27/12* (2006.01)
(52) U.S. Cl. ...................................... 137/359; 136/606

(58) Field of Classification Search ................ 137/359, 137/606
See application file for complete search history.

(56) References Cited

U.S. PATENT DOCUMENTS

| 3,067,436 A | * | 12/1962 | Freibott | ...................... 137/359 |
| 4,515,037 A | * | 5/1985 | Block | .......................... 74/553 |
| 4,519,581 A | * | 5/1985 | Paul | ........................... 251/268 |

* cited by examiner

*Primary Examiner*—Stephen M. Hepperle

(57) ABSTRACT

A decorative faucet assembly comprising a cold water handle and a hot water handle, each handle having a valve body; a longitudinal bore through said body, a first open end for flow of water therein and a second open end longitudinally opposite said first end. A plastic escutcheon is adapted to be secured onto said opposite end of said valve body and a plastic figurine in the form of a recognizable toy is operatively associated with said escutcheon for rotatably manipulating said valve into open and closed position.

4 Claims, 3 Drawing Sheets

DECORATIVE FAUCET ASSEMBLY FORMED OF PLASTIC FIGURINE MOLDED ONTO METAL PARTS

FIELD OF THE INVENTION

The present invention relates generally to plumbing accessories such as a faucet and faucet assembly, and is particularly related to such faucet assemblies and faucet handles formed by molding, as a unitary structure, a decorative plastic figurine onto a metal part for operating the faucet handles.

BACKGROUND OF THE INVENTION

A variety of faucets and faucet handles are commonly used for controlling water flow into sinks, bathtubs, etc. These faucets and faucet handles are often provided in different shapes and are generally made of metals such as, e.g., steel or brass. In order to enhance the aesthetics of these accessories, decorative faucets and faucet handles have been suggested and described in some prior art patents. For example, U.S. Pat. No. 4,876,766 issued to Richard K. Cohen on Oct. 31, 1989 describes a decorative faucet handle for mounting on any conventional faucet stem. The faucet handle may be in a decorative shape such as an inanimate figure, a fish, a frog, a duck, a bird, etc., and is generally made of brass.

Other types of faucets have been described which are aimed at enhancing their appeal to consumers. See, e.g., U.S. Pat. No. 4,353,139 issued to Richard M. Wainwright on Oct. 12, 1982 and U.S. Pat. No. 5,482,078 issued to Thomas Yeh on Jan. 9, 1996. The Yeh patent describes a water faucet-fitting seat terminating in a cow head and includes an electrical circuit preprogrammed to produce the "Moo-Moo" howl of the cow.

A combination toy and faucet fountain is described in U.S. Pat. No. 5,337,956 issued to William C. Crutch on Aug. 16, 1994. The faucet fountain comprises faucet fountain core including a tubular body enclosed by a hollow jacket having a fanciful object molded on its exterior surface. The molded object may be a nose on the face of a clown, and the clown's face is painted on the exterior surface of the jacket, all as shown in FIGS. 1-4 of said patent and described with reference to these figures.

A more recent patent, i.e., U.S. Pat. No. 6,205,598 issued to Ruth Ann Black on Mar. 27, 2001 describes a protective covers for covering the knobs and spouts of bathtubs and showers and in FIG. 3 shows an elephant having a front wall forming its face and ears, and a spout cover shaped into a trunk of the elephant.

Different shaped plumbing accessories are also featured in various design patents such as, e.g., Des. 298,161 issued to Michael A. Garcia on Oct. 18, 1988; Des. 305,926 issued to Michael J. Buther on Feb. 6, 1990; Des. 326,312 and Des. 326,312, both issued to Gail B. Frankel on May 19, 1992; Des. 378,232 issued to Gail B. Frankel on Feb. 25, 1997 and U.S. D465,095 issued to Rachelle Siefken on Oct. 29, 2002.

None of the aforementioned patents, and so far as it is known no other patents are known which disclose the use of plastic or plastic toys or figurines which are molded onto metal parts to form a unitary integral structure which can be used as the operative part of the faucets and faucet handles.

It is therefore an object of the present invention to provide faucets and faucet handles formed of plastic and metal molded together to define an operative unitary integral structure designed to manipulate the flow of hot water and cold water.

It is also an object of the present invention to provide bathtub faucets and faucet handles formed of plastic figurines molded onto metal to form an operative structure of the assembly which has considerable consumer appeal.

The foregoing and other features of the present invention will be more fully comprehended from the ensuing detailed description with reference to the various drawings herein.

SUMMARY OF THE INVENTION

The present invention provides a decorative faucet assembly which is not only functional but is also lightweight and attractive with considerable consumer appeal. The invention uses plastic figurines in the form of various recognizable toys to manipulate components of the faucet assembly, wherein the plastic is molded onto the basic functional metal parts.

The decorative faucet assembly of the present invention comprises a cold water handler, a hot water handler and a tubular faucet. The cold water handler and the hot water handler are similar in structure and comprise an externally threaded valve body having a longitudinal central bore. The valve body has a lower end which can be connected to an external water source, an upper open end and a means, such as a set screw operatively positioned in or at said upper end and which can be manipulated to open or close the valve. A hollow short tubular outlet is attached or welded to the valve body in the proximity of the lower end, said outlet adapted to be connected to a braid hose such that water flows our of said outlet, through said braid hose and into a faucet tube which is disposed between the cold water handler valve and the hot water handler valve.

Each valve body is securely held in position by a plastic escutcheon which has a generally dome-shaped upper surface and a recessed bottom. A generally hexagonal or other shaped plastic member having a central opening is formed in the recessed bottom of said escutcheon and is molded onto a threaded hollow metallic nipple. Thus, the plastic escutcheon is mounted on the upper end of the valve body by inserting the valve body through the bottom of the escutcheon and out through the neck portion on the top dome surface thereof.

A plastic figurine in the form of a recognizable toy such as a plastic lion (for the cold water handler) or a tiger (for the hot water handler) has a generally flat bottom which includes an aperture designed to frictionally engage with a set screw and can be rotatably manipulated to turn the set screw into an open-valve or close-valve position.

The assembly also includes a hollow tubular faucet defined by a vertical portion and an upper bow-shaped portion. The tubular faucet is a metallic tube encased by, and molded onto a plastic jacket. The lower end of the vertical portion of the tubular faucet has side openings for connection to a braid hose through which water flows from each valve body into the tubular faucet. The vertical portion of the tubular faucet is retained by a plastic escutcheon similar to the escutcheon used for the cold water handler valve and the hot water handler valve, and the escutcheon is retained in position by a nut and a gasket for added rigidity. A plastic figurine may be mounted on the escutcheon for added decoration. The bowed portion of the tubular faucet terminates in a spout assembly and an aerator insert, and another toy figure may be mounted on the bowed portion, in the proximity of the spout and is positioned such that the toy head is pointed in the direction of water flow out of the aerator insert.

The provision of plastic-metal component parts offers a unique and attractive lightweight faucet assembly with increased consumer appeal.

BRIEF DESCRIPTION OF THE DRAWINGS

In the drawings wherein like reference numerals are employed to designate like parts wherever applicable.

DETAILED DESCRIPTION OF THE DRAWINGS

Figure 1:
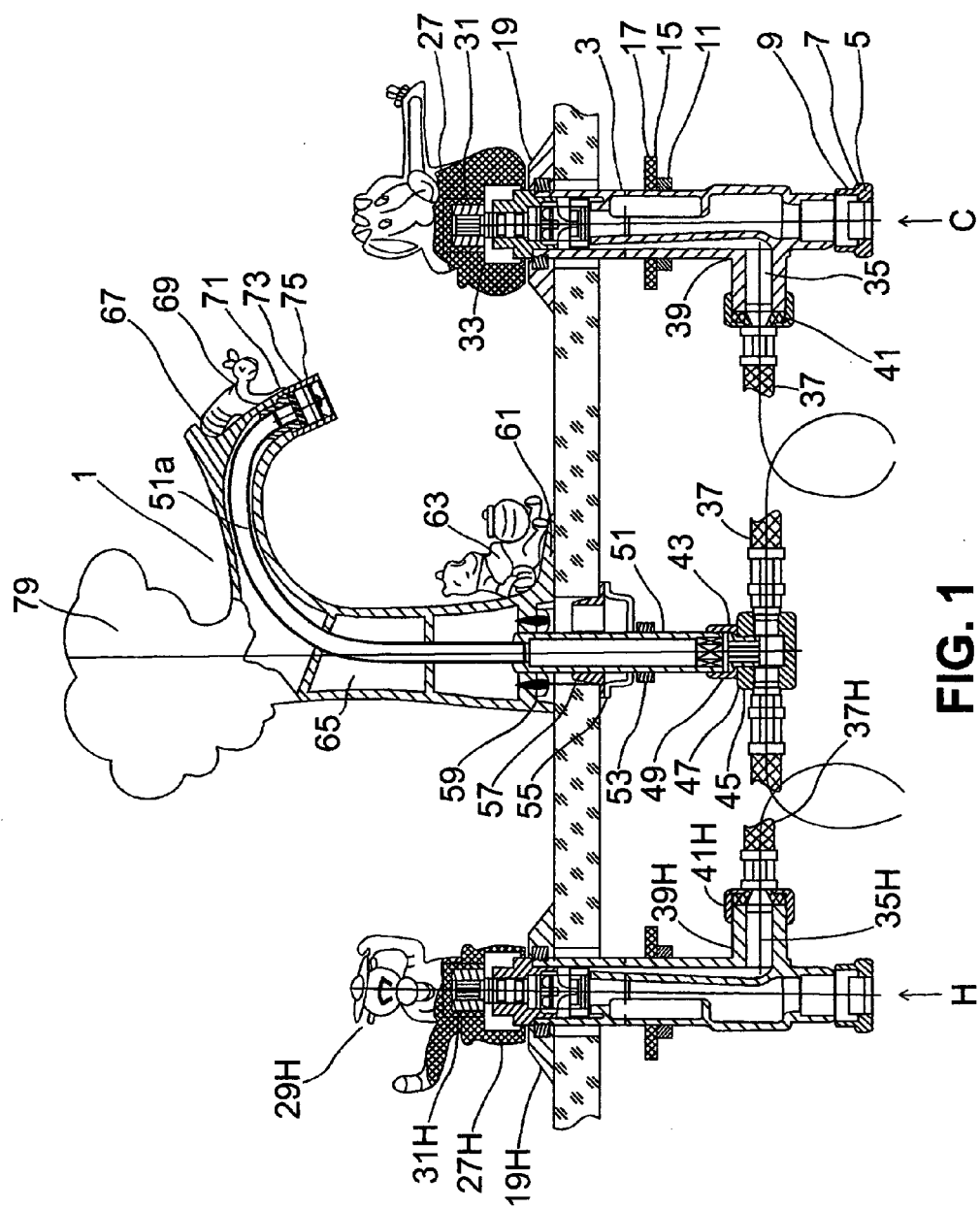
FIG. 1 is a side elevational sectional view of a faucet assembly formed according to the present invention, having two handles one for controlling the cold water flow and other for the hot water flow.
Figure 1A:
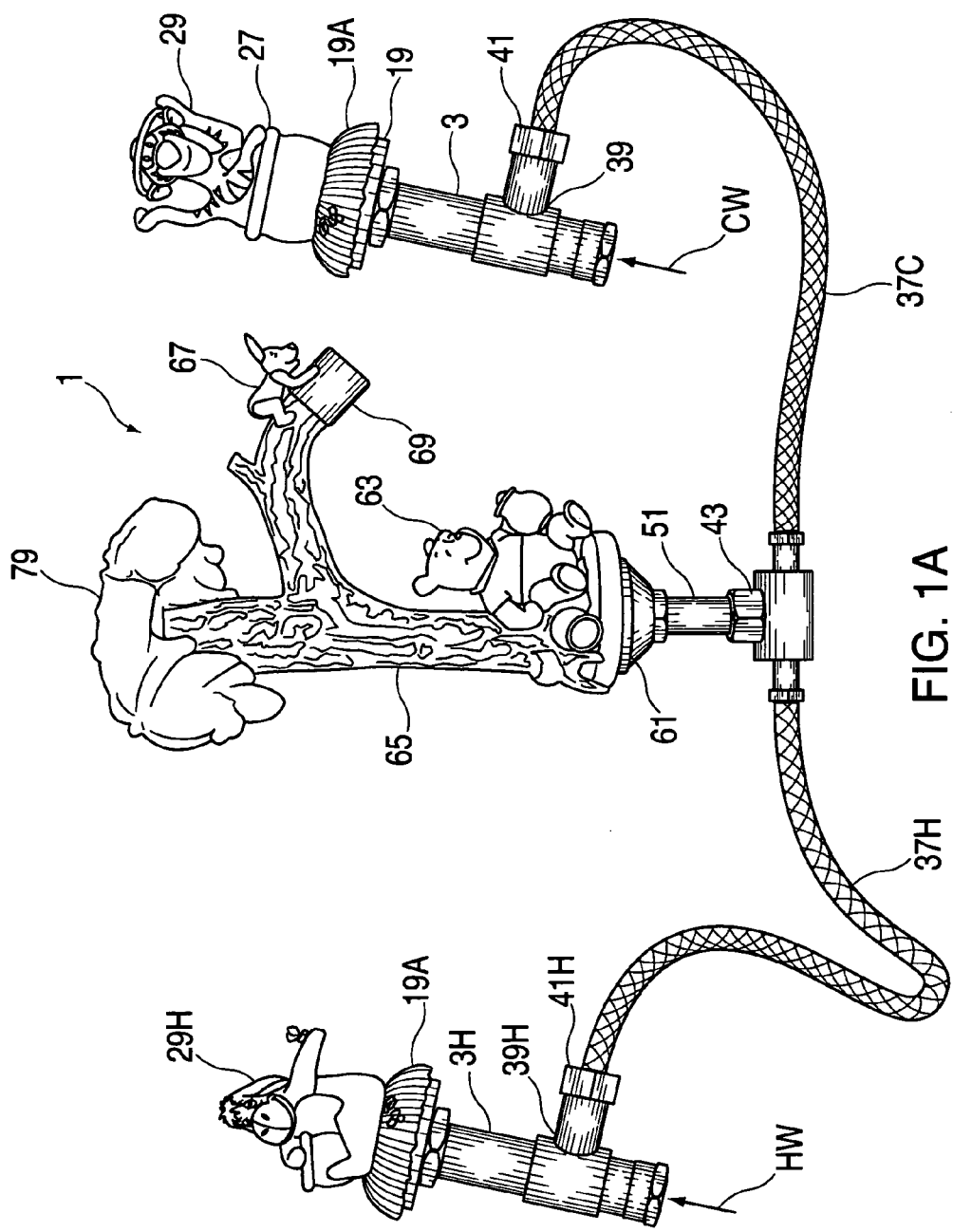
FIG. 1A is an assembled side view of the faucet assembly shown in FIG. 1 with the cold water handle and hot water handle rotated 180 degrees.
Figure 2:
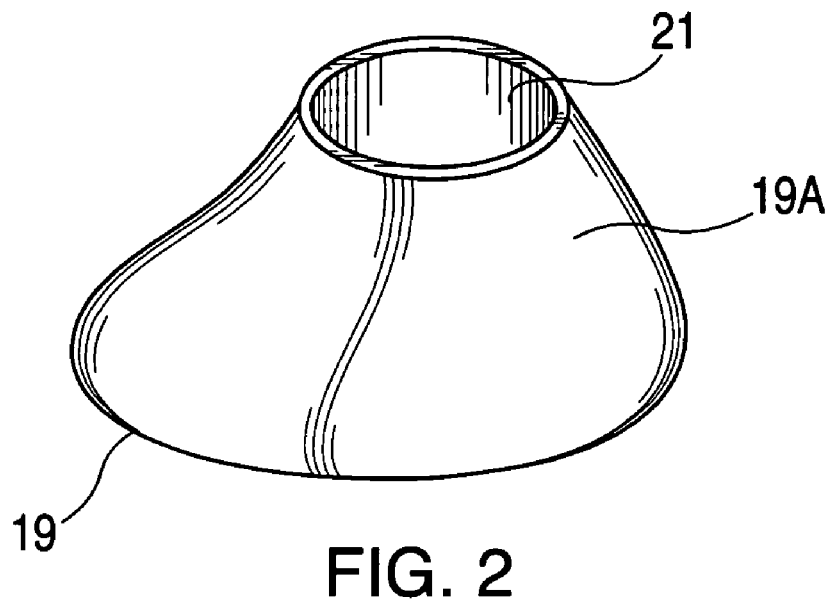
FIG. 2 is a side view of the escutcheon forming a part of the cold water handler assembly.
Figure 3:
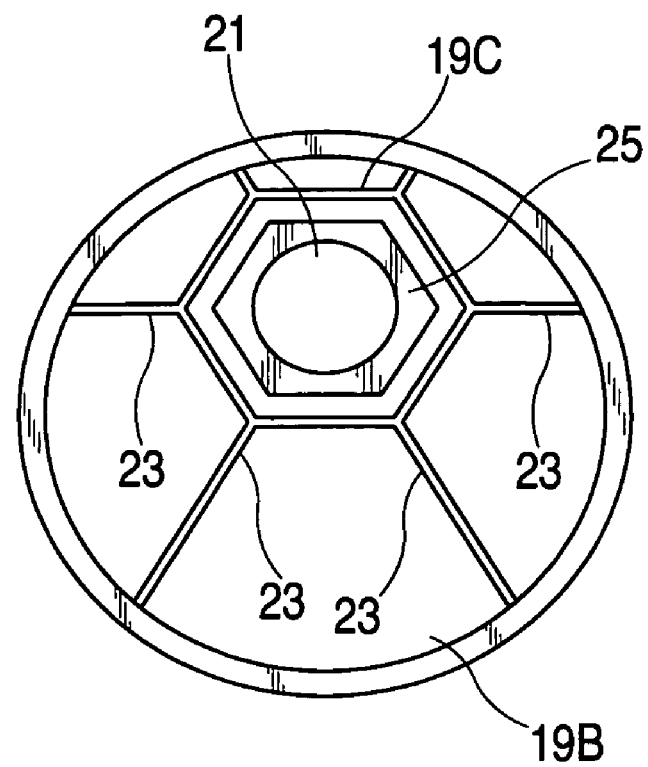
FIG. 3 is a bottom view of the escutcheon structure shown in FIG. 2.

Referring first to FIG. 1, there is shown a faucet assembly generally designated as 1 comprising a cold water handler and its operatively associated cold water valve, a hot water handler operatively associated with its hot water valve and a faucet tube, all as hereinafter described in more detail. Cold water from an external source (not shown) enters through an inlet 2 located at the bottom of externally threaded valve body 3 in the direction of the arrow C. A coupling nut 5 is internally threaded for threaded engagement with the externally threaded lower portion of the valve body 3 and is adapted to be connected to a cold water conduit. A slip washer 7 and a gasket 9 are disposed inside the coupling nut 5 to prevent the cold water from leaking from the system. An internally threaded hex-nut 11 is threadedly engaged onto the externally threaded valve body 3 and is adapted to be raised or lowered as desired. A washer 15 and gasket 17 are operatively associated with the hexnut 11 such that when the hexnut is raised upward, washer 15 and gasket 17 will form a seal against the base of a plastic escutcheon member 19. As shown in FIGS. 2 and 3, the plastic escutcheon member has a generally dome-shaped outer surface 19A having a raised integral neck portion 21 on its outer surface 19A, and a lower recessed structure 19B as shown in FIG. 3. Formed within the recessed plastic structure 19B is a hexagonal-shaped plastic member 19C integrally connected to the interior surface of the recessed structure 19B by the projecting arms 23. The hexagonal-shaped plastic member 19C has a bore within which is retained a metallic hexnut 25 molded integrally to the hexagonal-shaped plastic member 19C. The metallic hexnut 25 has a central bore and is internally threaded for threaded engagement with the external threads of the valve body 3.

Referring back to FIG. 1 there is shown a cold water handler 27 in the form of a plastic figurine 29 such as an animal, which has a recessed base having an aperture adapted to be mounted onto operative engagement with an adapter. The plastic figurine 29 is shown having an arm 33 extending laterally and is adapted to be gripped by the fingers and rotated so as to bias the adapter 31 into rotation, therefore opening and closing the valve. Cold water entering through the valve inlet flows through externally threaded hollow tube 35 and through the braid hose 37c. The externally threaded hollow tube 35 has one end welded to the valve body as in 39 and its other end is attached to the braid hose 37 by means of an internally threaded hexnut 41. The other end of the braid hose 37 is threadedly attached to a hose coupler 43 which has an internally threaded bore for threadedly receiving and engaging the threaded end of the braid hose. Seated on and sealed to the top of the coupler 43 is an internally threaded adapter 45 having an 0-ring 47 seated at the bottom of the adapter and includes a gasket 49. The adapter 45 is threadedly attached to the externally threaded faucet tube 51, and is manipulated up or down by the nut 53 to bias the washer 55, seal gasket 57 and flange 59 against the base of a plastic escutcheon member 61 similar to the plastic escutcheon 19. A figurine, e.g., a toy 63 such as, e.g., a bear, is securely attached to the top surface of the escutcheon 61 for enhanced aesthetic appearance.

The faucet tube 51 extends upwardly through the neck 61a of the plastic escutcheon 61 and may be bowed at its top portion as in 51a to define a generally walking cane-type shape, although such construction is not strictly necessary. In accordance with the present invention, the metallic faucet tube 51, including its bowed portion 51a are entirely molded with a suitable plastic such as, e.g., polyvinyl chloride (PVC), acrylonitrile-butadiene-styrene (ABS), high-impact polystyrene, but PVC and ABC constitute the plastics of choice, with the plastic being molded onto the exterior surface of the metal faucet tube, to define a plastic-metal molded tube 65 and a toy figurine 67 such as, e.g., a rabbit, is secured over the spout 69 facing in the direction of water outflow. Mounted within the spout 69 of the plastic-metal tube 65 is a gasket 71, a cap bolt 73 and aerator 75 through which cold water, hot water, or mixtures thereof flow out into a receptacle. For increased aesthetic appearance, the plastic-metal faucet tube may be branched to form the structure 79 formed on top of the branched portion.

The structure of the hot water handler HW is the same as the structure of the cold water handler CW. Thus, all component parts of the hot water handler HW are the same as the component parts of the cold water handler CW with hot water from an outside source (not shown) flowing in the direction of the arrow H as shown in FIG. 1. The operation and manipulation of the hot water handler HW is the same as to the operation and manipulation of the cold water handler CW. The only differences is that a different figurine, e.g., a toy tiger serves the same function as the animal toy used for the cold water handler. The component parts of the cold water handler CW and hot water handler HW are shown in the following table wherein the CW components are designated in the left column and the corresponding HW components are designated in the right column followed by the letter "H".

TABLE

| Cold Water Handler Components | Hot Water Handler Components |
|---|---|
| inlet C | inlet H |
| valve body 3 | valve body 3H |
| coupling nut 5 | coupling nut 5H |
| slip washer 7 | slip washer 7H |
| gasket 9 | gasket 9H |
| hexnut 11 | hexnut 11H |
| washer 15 | washer 15H |
| gasket 17 | gasket 17H |
| escutcheon member 19 | escutcheon member 19H |
| cold water handler 27 | hot water handler 27H |
| figurine 29 | figurine 29H |
| set screw 31 | set screw 31H |

TABLE-continued

| Cold Water Handler Components | Hot Water Handler Components |
|---|---|
| arm 33 | arm 33H |
| hollow tube 35 | hollow tube 35H |
| braid hose 37 | braid hose 37H |
| welded part 39 | welded part 39H |
| hexnut 41 | hexnut 41H |

In operation, the inflow of cold water and hot water are adjusted by opening or closing the respective valves using the figurines (lion or tiger) to open, adjust or close the flow of cold or hot water, as desired, through the braid hose into the faucet tube and out through the aerator.

It must be understood that the general operation and controlling the flow of hot and cold water is basically the same as known in the art when using all metallic components. In the present invention, however, several basic parts used for manipulating and controlling the hot and cold water flow are made of plastic parts molded externally onto metal. The use of such novel part serves the additional function of providing a lighter weight assembly which is also attractive and appealing to the consumers.

The invention claimed is:

1. A decorative faucet assembly comprising a cold water handler, a hot water handler and a tubular faucet for passage of water therethrough, each of said cold water handler and hot water handler comprising an externally thread valve body having a longitudinal central bore, said valve body having a first open end adapted to be connected to a water source, a second open end longitudinally opposite said first open end, a means operatively associated with said second open end which means is adapted to be manipulated to open or close said valve, a third open outlet in said valve body disposed between said first open end and said second open end, said third open end adapted to be connected to a tubular member, a plastic escutcheon having a generally dome-shaped outer surface, an open neck portion extending up from said outer surface of said dome-shaped escutcheon, and a recessed lower surface having a generally hexagonal member formed therein with a central opening molded onto an internally threaded metallic hollow tubular portion adapted to be threadedly secured onto said valve body when said neck portion of said escutcheon is attached to said second open end of said valve body, a plastic figurine in the form of a toy having a recessed base, an aperture in said recessed base adapted to be frictionally engaged onto a said means for rotatably manipulating said valve body into open and close position to permit flow of water, said plastic of said escutcheon member being selected from the group consisting of polyvinyl chloride (PVC), acrylonitrile-butadiene-styrene (ABS) and high-impact polystyrene, said tubular faucet has a central bore, a first inlet for passage of cold water, a second inlet for passage of hot water and an outlet through which water flows out of the tubular faucet.

2. A decorative faucet assembly as in claim 1 wherein said tubular faucet is defined by a generally vertical tubular portion having a generally bow-shaped upper portion, a plastic escutcheon having a generally dome-shaped outer surface and an open neck portion extending up from said outer surface of said dome-shaped escutcheon, and a recessed lower surface having a generally hexagonal member formed thereon with a central opening molded onto an internally threaded metallic hollow tubular portion, said vertical tubular portion being inserted through said neck portion and retained in position by said plastic escutcheon, and wherein said bow-shaped portion of said tubular faucet has an outlet comprising a spout assembly and an aerator insert through which water flows out of the faucet assembly, and wherein said tubular faucet is entirely encased by and is molded integrally to a plastic material so as to form a unitary structure therewith.

3. A decorative faucet assembly as in claim 1 wherein the plastic material of said escutcheon and the plastic material molded onto said tubular faucet each is selected from the group consisting of polyvinyl chloride and acrylonitrile-butadiene-styrene polymers.

4. A decorative faucet assembly as in claim 2 wherein the plastic material of said escutcheon and the plastic material molded onto said tubular faucet each is selected from the group consisting of polyvinyl chloride and acrylonitrile-butadiene-styrene polymers.

* * * * *